United States Patent [19]
Kawamoto et al.

[11] Patent Number: 4,980,923
[45] Date of Patent: Dec. 25, 1990

[54] DILATION/EROSION CONVERSION CIRCUIT

[75] Inventors: Tetsumi Kawamoto; Shuichi Wakabayashi; Toshiyuki Yamada; Yuko Murayama, all of Tokyo, Japan

[73] Assignee: Seiko Instruments Inc., Tokyo, Japan

[21] Appl. No.: 306,280

[22] Filed: Feb. 2, 1989

Related U.S. Application Data

[63] Continuation of Ser. No. 92,236, Sep. 12, 1987, abandoned.

[30] Foreign Application Priority Data

Oct. 22, 1986 [JP] Japan ................................. 61-251074

[51] Int. Cl.⁵ .............................................. G06K 9/36
[52] U.S. Cl. .......................................... 382/41; 382/8;
382/49; 382/55; 382/27
[58] Field of Search ................... 382/8, 27, 41, 49, 55,
382/54, 56

[56] References Cited

U.S. PATENT DOCUMENTS

| 4,395,699 | 7/1983 | Sternberg | 382/49 |
| 4,477,926 | 10/1984 | Linger et al. | 382/8 |
| 4,481,664 | 11/1984 | Linger et al. | 382/8 |
| 4,641,356 | 2/1987 | Sternberg | 382/49 |
| 4,665,551 | 5/1987 | Sternberg et al. | 382/27 |

Primary Examiner—David K. Moore
Assistant Examiner—Michael Razavi
Attorney, Agent, or Firm—Spenseley Horn Jubas & Lubitz

[57] ABSTRACT

A circuit for processing a dilation conversion and erosion conversion of a digital image data to extract the feature of the image. A range N×N of the image data is processed by a simple circuit construction which a horizontal row extraction circuit holding N data and a conversion stage for converting N data are disposed in a crisscross arrangement.

7 Claims, 7 Drawing Sheets

ADDRESS ----- 0 1 2 3 4 5 6 7 8 9 10 11
PRIORITY ----- 12 10 8 6 4 2 1 3 5 7 9 11

FIG. 5B
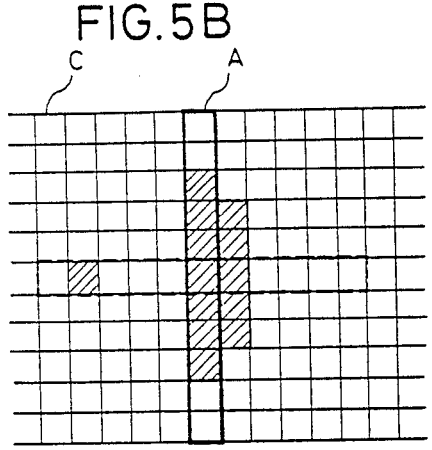
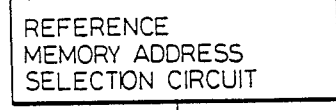
ADDRESS = 2
FIG. 5C
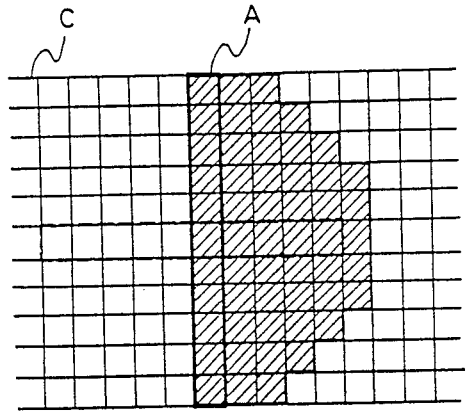
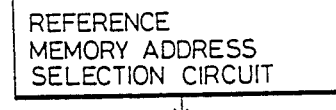
ADDRESS = 6
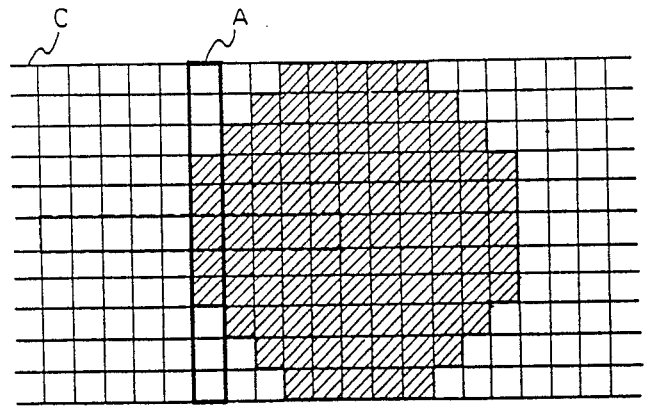
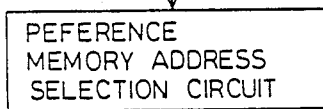
ADDRESS = 11
FIG. 5D

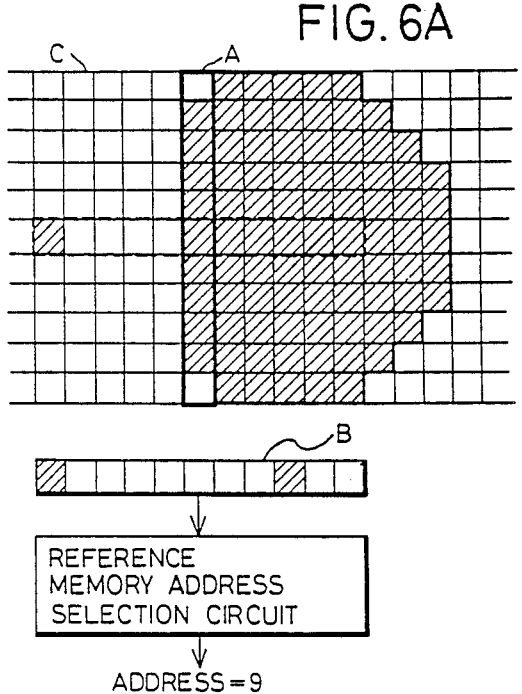
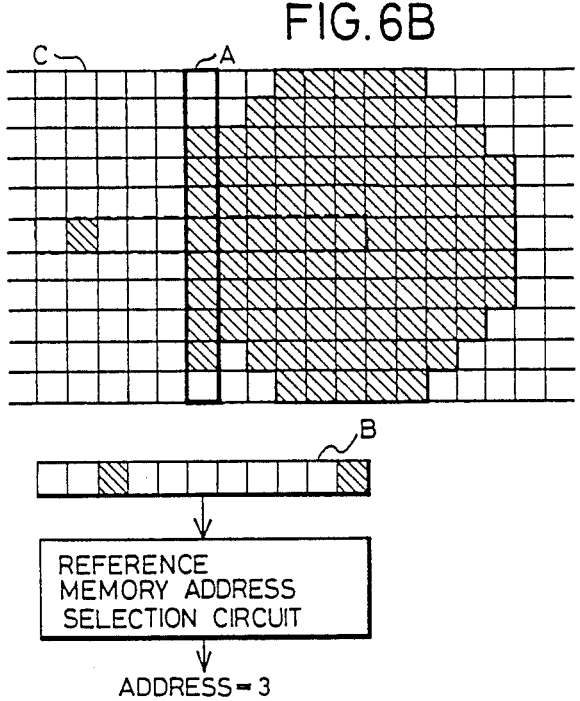

DILATION/EROSION CONVERSION CIRCUIT

This is a continuation of application Ser. No. 07/092,236 filed on Sept. 2, 1987 now abandoned.

BACKGROUND OF THE INVENTION

1. Field of the Invention

This invention relates to a circuit which is directed to image conversion of an input image from imaging means such as an area sensor and a digital image formed by a computer or the like.

More particularly, the present invention relates to a circuit which is directed:

(1) to eliminate noise of a binarized image, (2) to detect any protrusions or fall-off of an image, (3) to extract or remove corner portions of the image, and the like.

2. Description of the Prior Art

It has been known in the prior art that an apparatus for dilating/eroding an image by disposing in series conversion stages of a relatively small scale such as $3 \times 3$ in matrix so that dilation/erosion of an image in a small scale is made at each of the stages and predetermined dilation/ erosion of the image is made through a series of stages as a whole. For instance, U.S. Patent Specification No. 4,395,699 (Stanley R. Sternberg, May 29, 1981) discloses such a conventional dilation/erosion circuit.

In accordance with the conventional dilation/erosion circuit described above, however, it is very complicated to accomplish predetermined dilation/erosion by the combination of dilation/erosion of a small scale such as $3 \times 3$ and efficiency is extremely low. Furthermore, the combination of small scale dilation/erosion cannot accomplish conversion by dilation/erosion elements having a large radius of curvature. This problem can be solved, in principle, by use of a conversion circuit for effecting dilation/erosion for a large range of $N \times N$, but such a circuit becomes great in scale.

SUMMARY OF THE INVENTION

It is an object of the present invention to provide a simple circuit which can accomplish dilation/erosion conversion for a large scale of $N \times N$.

It is another object of the present invention to provide a circuit which can be used both for dilation conversion and erosion conversion.

The present invention takes into consideration the fact that ordinary elements used for dilation/erosion are round, oval or rectangular and their sectional area becomes greater towards the center and include the section of outer portions. Accordingly, the present invention provides a circuit construction capable of accomplishing dilation/erosion within the $N \times N$ range by disposing one column of conversion stage for converting N data and one row of horizontal row extraction circuit for holding N data before conversion in such a fashion that the center data to be converted by the conversion stage and the center data to be held by the horizontal row extraction circuit assume the same position of an image memory at the same timing.

When the serial data stream read out from an image memory is inputted to the circuit having the construction described above, a reference memory address selection circuit outputs an address having the largest section in the section of a dilation/erosion element stored in a reference memory corresponding to data of black in the data stream inputted to a horizontal row extraction circuit, and the conversion stages calculate logical sum between one line of data, that are being converted and outputted by a vertical column extraction/delay circuit and the section of one line of the reference memory selected by the address described above for each data. After conversion is complete, the data are sequentially written into the image memory so that the image in the image memory can be dilated as a whole by the element stored in the reference memory.

In case of erosion, on the other hand, the serial data stream read out from the image memory are inversed and after dilation conversion described above is effected, it is again inversed and then written into the image memory. In this manner, dilation/erosion can be processed by the same conversion circuit.

BRIEF DESCRIPTION OF THE DRAWINGS

FIGS. 5A to 5D and 6A to 6C are explanatory views of the dilation process.

DETAILED DESCRIPTION OF THE PREFERRED EMBODIMENT

Figure 1:
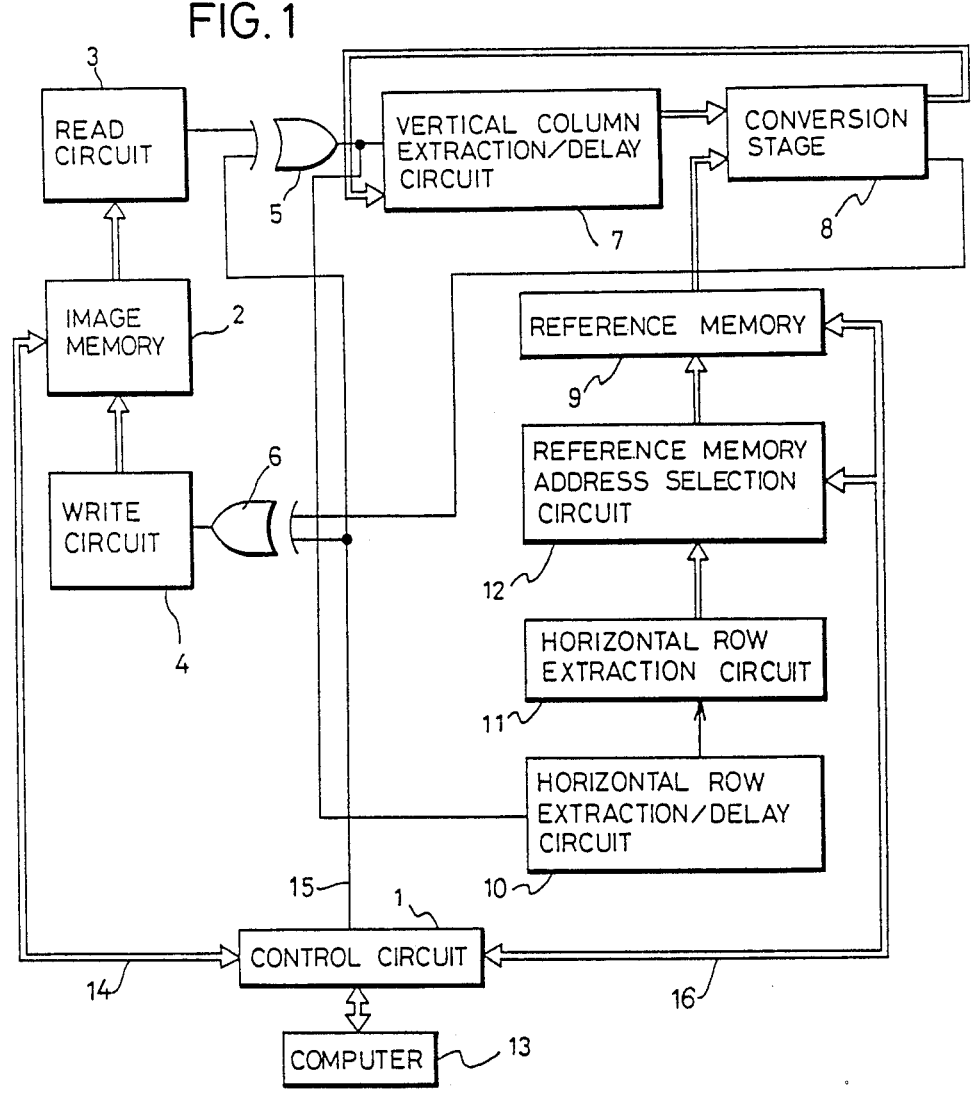
FIG. 1 is a block diagram showing a dilation/erosion conversion circuit of an image in accordance with the present invention.

Hereinafter, one embodiment of the present invention will be described with reference to the accompanying drawings. In FIG. 1, a control circuit 1 makes overall control of the circuit of the invention such as the data input/output between a computer 13 and an image memory 2 and a reference memory 9, switching of dilation/erosion, generation of addresses of the image memory 2 during conversion, generation of clocks at each portion of the circuit, and so forth by means of control lines 14, 15, and 16. The image memory 2 stores black and white binary image data before and after conversion. The reference memory 9 stores binary image figures used for dilation/erosion from the computer 13 through the control circuit 1. The sequence of the size of the sectional areas of the figures stored in the reference memory 9 is inputted to a reference memory address selection circuit 12 through the control circuit 1, and this circuit 12 outputs the address of the figure having the largest sectional area among those stored in the reference memory 9 and corresponding to the black data position of the data stream in a horizontal direction held in a horizontal row extraction circuit 11.

A vertical column extraction/delay circuit 7 stores the image data during conversion. The size in the horizontal direction is the same as that of the horizontal direction of the image memory 2 while the size in the vertical direction is the same as the predetermined size after dilation/erosion. A horizontal row extraction/delay circuit 10 corrects the delay so that the center of one column in the vertical direction that is converted by the conversion stage 8 and the center of one row in the horizontal direction held by the horizontal row extraction circuit 11 become the data of the same position of the image of the image memory 2 at the same timing.

The read circuit 3 reads the image data of the image memory 2 in a word unit by the address generated by the control circuit 1 and converts the image data to a serial data. The write circuit 4 inputs the serial data after conversion is complete, and writes the data in the word unit into the image memory 2 by the address generated by the control circuit 1. One of the inputs of each of a input inversion/non-inversion gate 5 and output inversion/non-inversion gate 6 is controlled by the control circuit 1, and when inversion/non-inversion of the serial data to be converted is switched, dilation/erosion can be accomplished by the same conversion circuit. The conversion stage 8 inputs the data of one column in the horizontal direction that is outputted from the vertical column extraction/delay circuit 7 and being converted and one column of the section of the dilation/erosion figure outputted from the reference memory 9 and calculates the logical sum between them. The data of the final row after all conversion is complete is outputted to the output inversion/non-inversion gate 6 while the data of the other rows are inputted to the next row of the vertical column extraction/delay circuit 7.

Figure 2:
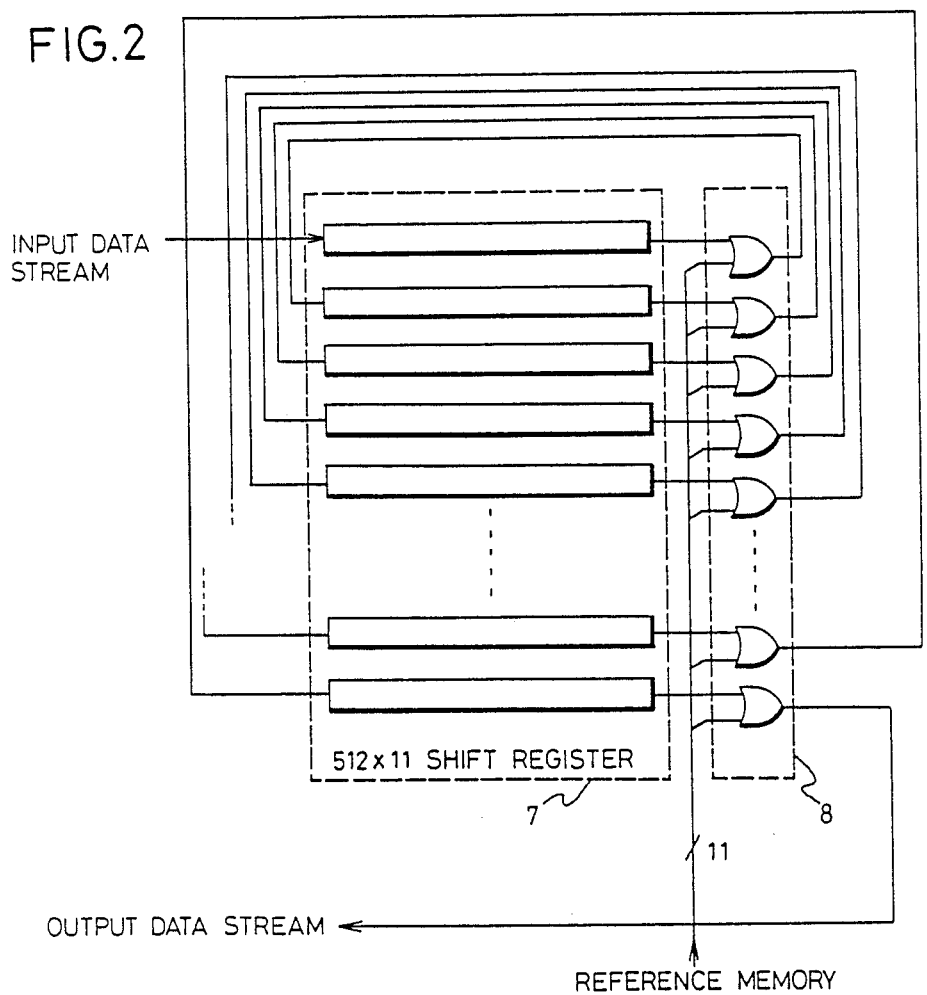
FIG. 2 is a detailed view of a vertical column extraction/delay circuit and a conversion stage.

FIG. 2 shows in detail an example of the vertical column extraction/delay circuit 7 and the conversion stage 8. In this case, the horizontal length of the image memory is assumed to be 512 bits and the length of one column to be converted is assumed to be 11 bits. The vertical column extraction/delay circuit 7 consists of 11-stages 512-bits shift registers, holds the images for 11 rows during conversion and sequentially shifts the data by shift clocks. The conversion stage consists of 11 OR gates and dilates the portion 1 of the data by calculating the logical sum, for each bit, between one column of data during conversion and the data from the reference memory.

Figure 3:
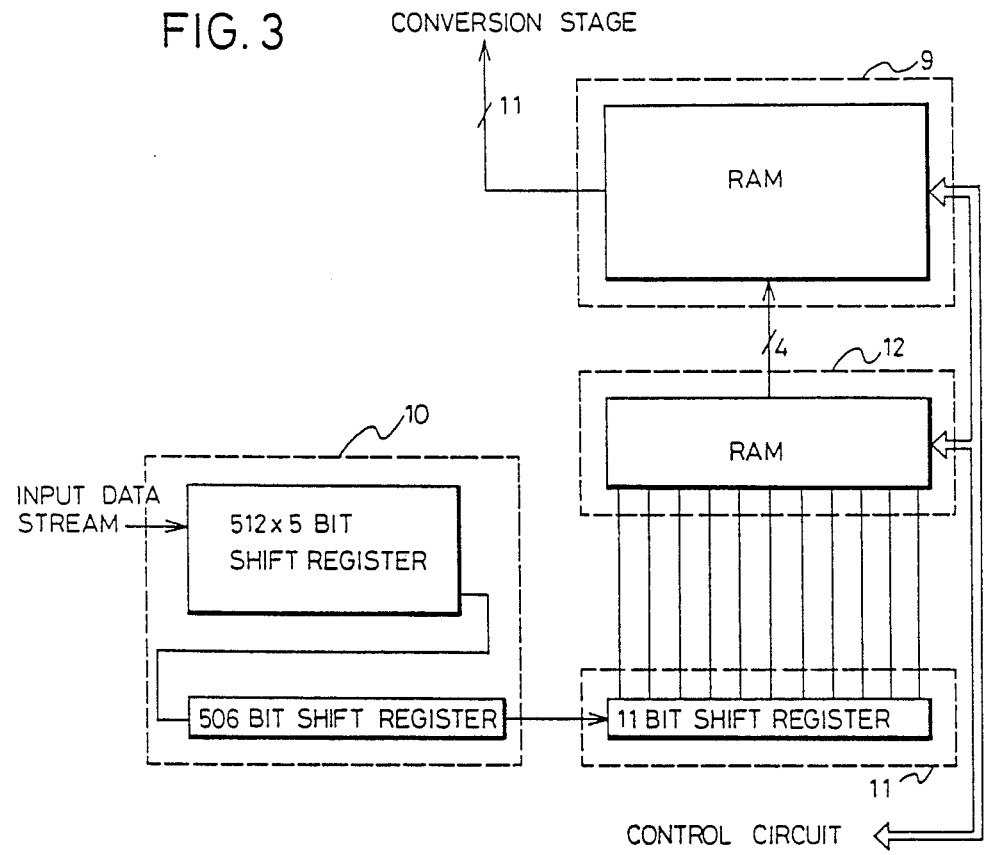
FIG. 3 is a detailed view of a horizontal row extraction/delay circuit and a horizontal row extraction circuit.

FIG. 3 shows detailed example of each of the horizontal row extraction/delay circuit 10, the horizontal row extraction circuit 11 and the reference memory address selection circuit 12. The horizontal row extraction/delay circuit 10 consists of five stages of 512-bits shift registers and a 506-bits shift register and its output is applied to the horizontal row extraction circuit 11 consisting of 11-bits shift registers. The sixth bit (or the center bit) of the horizontal row extraction circuit and the output of the shift register of the sixth stage of the vertical column extraction/delay circuit 7 of FIG. 2 correspond to the data of the same position of the image memory at the same timing. The 11-bits data held by the horizontal row extraction circuit 11 are applied to the reference memory address selection circuit 12 which consists of a RAM, and the selection circuit 12 outputs the address of the section of the reference memory corresponding to the bit which is 1 (black) and has the highest priority among the 11-bits data.

Next, the dilation process will be described with reference to the drawings.

Figure 4:
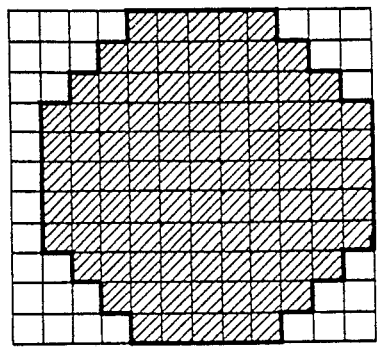
FIG. 4 shows an example of the content of the reference memory.

FIG. 4 shows a figure which is stored in the reference memory and used for dilation. It will be hereby assumed that each mesh represents the image data of one point and hatching represents black data. It will be assumed further that priority of this figure is set to the reference memory address selection circuit 12 in the sequence shown in this drawing.

Figure 5A:
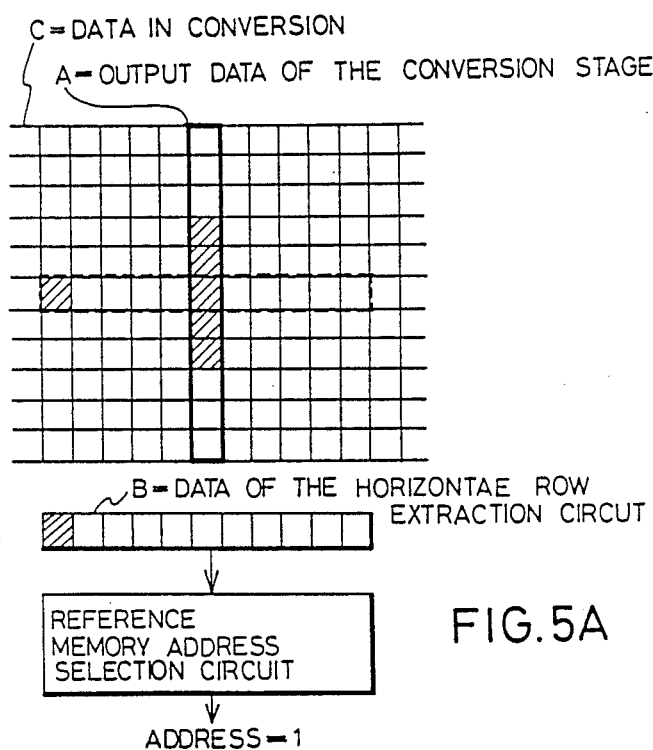

FIGS. 5A to 5D show the dilation process in which the black data of one point is dilated to correspond to that shown in FIG. 4. The data C in conversion shown in FIG. 5A represents part of the data held by the vertical column extraction/delay circuit and sequentially shifted from left to right. The output data A of the conversion stage represents the content of the output of the conversion stage 8. The data B of the horizontal row extraction circuit represents the 11-bits data held by the horizontal row extraction circuit 11 (the 11 bit shift register) and is sequentially shifted from left to right in the same way as the data C during conversion. When the black data of the point has shifted through the delay circuit 10 and is held at the first position of the data B of the horizontal row extraction circuit, the reference memory address selection circuit outputs the address value 1 so that the section having the address 1 in FIG. 4 is selected. As a result five black data are provided from the reference memory 9 to the conversion circuit 8 and are outputted as the output data A of the conversion stage as shown in the drawing. When no black data is held in the horizontal row extraction circuit, the reference memory address selection circuit outputs 0 as the address. In this case the outputs of the reference memory are all white (0), and the one column of data on the left side of the output data A of the conversion stage become as such the output of the conversion stage.

FIG. 5B shows the content when the data B of the horizontal row extraction circuit and the data C during conversion are shifted by one bit to right. In the data B of the horizontal row extraction circuit, the black data is at the second position, and 2 is outputted from the reference memory address selection circuit as the reference memory address. Then, the section having the address 2 in FIG. 4 is selected and seven black data are outputted as the output data A of the conversion stage.

When the data is sequentially shifted to right in this manner, the sections shown in FIG. 4 are sequentially written as shown in FIGS. 5C and 5D. When the black data are shifted to the 11th bit of the data B of the horizontal row extraction circuit in FIG. 5D, the figure of FIG. 4 is written as a whole into the data C which is under conversion. The black data of one point is dilated through the process described above to the figure shown in FIG. 4.

Thus, dilation is achieved by providing two shift registers through which a point to be dilated is simultaneously shifted. The first shift register cooperates with the conversion circuit to store the data during conversion and subsequently shift it back to the image memory, and the second shift register controls the addressing of a memory so that a dilation figure corresponding to a point is provided to the conversion circuit and written into the first shift register at the proper location (e.g., with the center of the enlarged figure coinciding with the position of the point to be enlarged). A single point to be dilated is therefore replaced with a figure from the reference memory in a desired positional relationship with respect to the original point.

Figure 6C:
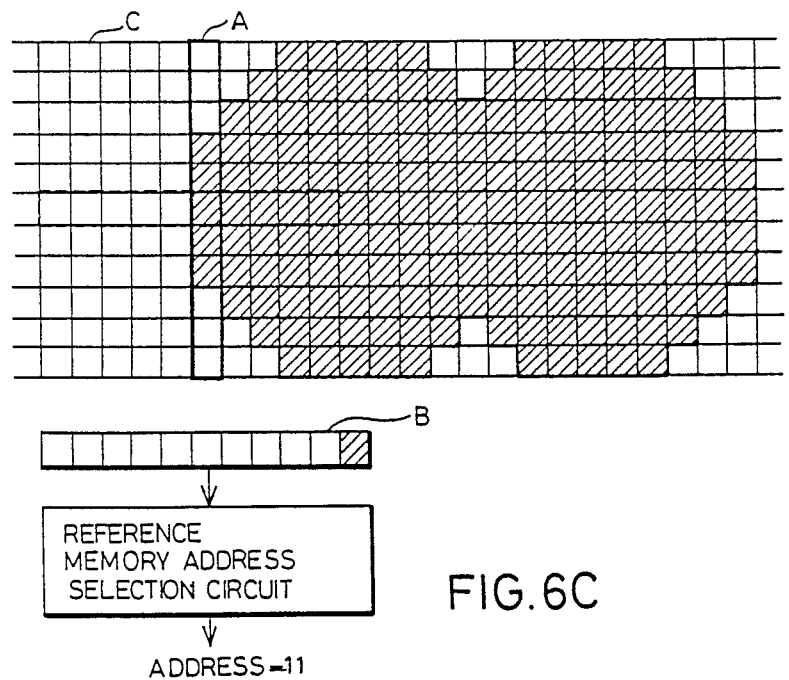

FIGS. 6A to 6C show the dilation process when at least two black data exist in the image memory and the horizontal row extraction circuit holds at least two black data. FIG. 6A shows the case where the black data exist at the first and ninth position of the data B of the horizontal row extraction circuit through the same process as shown in FIGS. 5A to 5C. According to the priority sequence defined as FIG. 4, the reference address selection circuit outputs 9 as the address having higher priority. FIG. 6B shows the case where the data is further shifted by two bits to right from FIG. 6A. The content B of the horizontal row extraction circuit has the black data at the third and 11th positions and the reference address selection circuit outputs the address 3 having higher priority. The output data A of the conversion stage becomes such as shown in the drawing. FIG. 6C shows the case where the data is shifted further by 8 bits to right from FIG. 6B so that the black data of the two points are converted in the dilated figure shown in FIG. 4 respectively.

The black portion can be eroded by dilating the white portion. Namely, erosion can be accomplished by converting the white data of the image memory 2 to the black data by the input inversion/non-inversion gate 5 shown in FIG. 1, effecting the dilation process described above, then effecting inversion by the output inversion/non-inversion gate 6 and writing into the image memory.

In the embodiment described above, the computer 13 lets the reference memory 9 and the reference memory address selection circuit 12 store the dilation/erosion figure data through the control circuit 1, starts conversion after providing the selection command of dilation/erosion and the memory addresses of the image memory 2 before and after conversion to the control circuit 1, lets the read circuit 3 sequentially read the image data and after the data are inputted to all parts of the vertical column extraction/ delay circuit 7, converts the image by reading out the data for one picture so as to dilate or erode the picture as a whole.

As described above, the present invention combines one column of conversion stages for converting N data with the horizontal row extraction circuit for storing N data and can execute the dilation/erosion processing of a large range of N×N at a high speed by a simple circuit construction.

What is claimed is:

1. A dilation/erosion conversion circuit for image processing each pixel of a binarized image to covert each pixel into a predetermined pixel group, comprising:
   an image memory means for storing binarized image data made up of a matrix of pixels;
   a read means coupled to said image memory means for sequentially reading out the data content of said image memory means in a parallel form and converting said parallel data content to a serial data stream;
   a vertical column extraction/delay means for sequentially extracting one column of data having a predetermined length from said serial data stream;
   a horizontal row extraction means for extracting one row of data having a predetermined length from said serial data stream;
   a reference memory means coupled to said horizontal row extraction means for storing a pattern of data corresponding to said predetermined pixel group;
   a conversion means coupled to said vertical column extraction/delay means and said reference memory means for converting a column of data extracted by said vertical column extraction/delay means in accordance with selected pixel group data output from said reference memory means in response to a row of data extracted by said horizontal row extraction means, whereby each pixel of image data extracted from said serial data stream is selectively dilated or eroded by said predetermined pixel group;
   means for circulating a plurality of data outputs from said conversion means to said vertical column extraction/delay means; and
   a write means coupled to said image memory means and said conversion means for sequentially writing one of said plurality of data outputs of said conversion means into said image memory means.

2. A dilation/erosion conversion circuit for image processing according to claim 1 further comprising:
   an input inversion/non-inversion means coupled between said read means and said vertical column extraction/delay means for controlling inversion and non-inversion of said serial data stream from said read means; and
   an output inversion/non-inversion means coupled between said write means and said conversion means for controlling inversion and non-inversion of said converted serial data stream from said conversion means.

3. A dilation/erosion conversion circuit for image processing according to claim 1, wherein said image memory means comprises R rows × C columns of memory elements in a two-dimensional matrix of pixels.

4. A dilation/erosion conversion circuit for image processing according to claim 1, wherein said reference memory means comprises (2N−1)×M bits of readable and writable memory.

5. A dilation/erosion conversion circuit for image processing according to claim 1, wherein said vertical column extraction/delay means comprises (2N−1) shift registers, each shift register having C bit stages, a serial input port and a serial output port, and each shifting every bit by one bit simultaneously in response to a common shift clock signal, one of the serial input ports of said (2N−1) shift registers receiving said serial data stream.

6. A dilation/erosion conversion circuit for image processing according to claim 1, wherein said conversion means comprises (2N−1) OR gates connected one-to-one to said (2N−1) shift registers, each OR gate having two inputs and one output, whereby one of said inputs of said OR gate is connected to a serial output port of a shift register corresponding to said OR gate, the other input of said OR gate is connected to one of the outputs of said reference memory, and each output of each of said (2N−1) OR gates except one OR gate is connected to a serial input port of a shift register next to the shift register corresponding to said each of said OR gates, and the output of the exceptional OR gate is connected to said write means.

7. A dilation/erosion conversion circuit for image processing according to claim 1, wherein said horizontal row extraction means comprises:
   a first shift register having (C×N−N) bit stages, shifting every bit by one bit sequentially in response to a common shift clock signal, and receiving said serial data stream;
   a second shift register having (2N−1) bit stages and (2N−1) outputs corresponding one-to-one to said (2N−1) bit stages, shifting every bit by one bit sequentially in response to said common shift clock signal, and receiving the output data of said first shift register; and
   reference memory address selection means responsive to the output data of said second shift register.

* * * * *